May 20, 1952  F. TREMBLEY  2,597,549
COOLING DEVICE FOR ENGINES
Filed Sept. 26, 1949  3 Sheets-Sheet 1

INVENTOR
FERNAND TREMBLEY

May 20, 1952   F. TREMBLEY   2,597,549
COOLING DEVICE FOR ENGINES
Filed Sept. 26, 1949   3 Sheets-Sheet 2
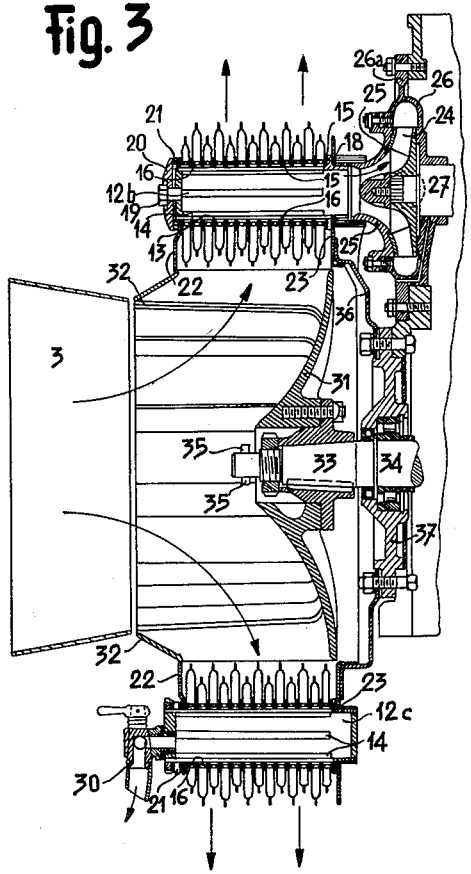
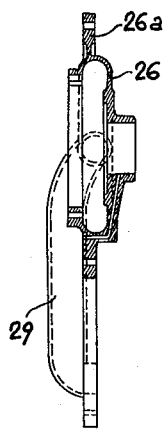
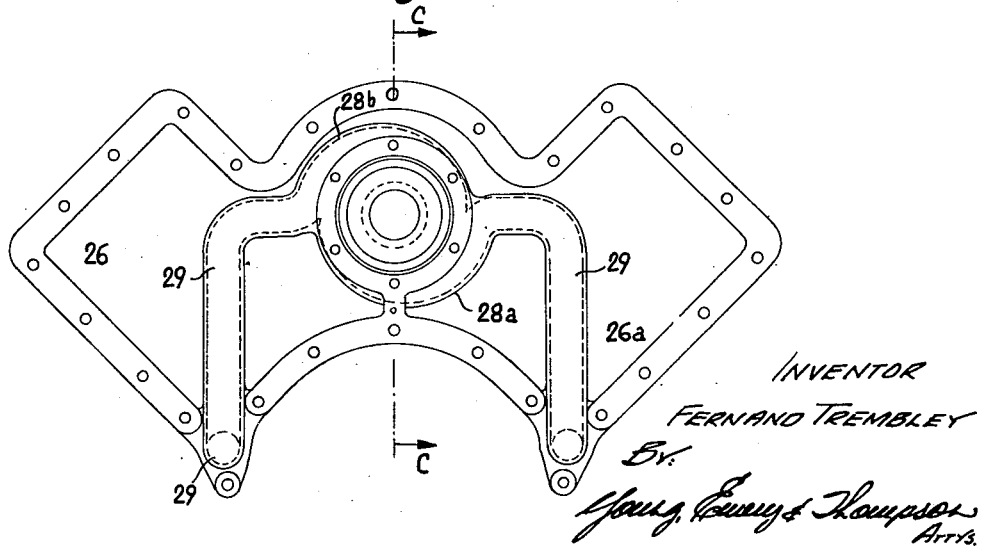

May 20, 1952 F. TREMBLEY 2,597,549
COOLING DEVICE FOR ENGINES
Filed Sept. 26, 1949 3 Sheets-Sheet 3

INVENTOR
FERNAND TREMBLEY

Patented May 20, 1952

2,597,549

UNITED STATES PATENT OFFICE 2,597,549

COOLING DEVICE FOR ENGINES

Fernand Trembley, Bellerive, Geneva, Switzerland, assignor to Societe de Recherches Techniques et D'Exploitations Industrielles, Geneva, Switzerland, a corporation of Switzerland Application September 26, 1949, Serial No. 117,906
In Switzerland October 18, 1948

8 Claims. (Cl. 123—41.48)

The present invention has for its subject a cooling device with water circulation for automobile engines and other engines actuating land, air or marine vehicles, or for engines secured on movable or stationary chassis.

The cooling devices with water circulation, called radiators, generally used have numerous disadvantages; the principal of these disadvantages is the very large power absorbed by the front radiators which, moreover, prevent the coefficient of the aerodynamic shapes of the vehicle from being improved.

The present invention has for its subject a cooling device formed by an exchanger between the liquid of the water circulation of the engine and the cooling air formed by a pile of hollow cooling elements of annular sectors with undulated surfaces, the concentric waves of the surfaces of two adjacent elements being displaced and interengaging with one another so as to form between them sinuous radial passages, the cooling elements being held at the desired spacing by threading on at least one supply tube and at least one outlet tube for the cooling liquid with the interposition of joints, communications being provided between the interior of the tubes and the interior of the cooling elements and a turbine driven by the engine, which propels air through the radial passages of the exchanger.

The cooling elements may be formed by two parts or plates undulated in opposite direction and secured together in a fluid-tight manner at their periphery, by continuous electric welding.

The bottoms of the waves produced on a portion at least of two parts of an assembled cooling element may be united and assembled point by point by electric welding so as to form a series of tubes secured together.

At least the end portions of the cooling elements in the forms of an annular sector may form chambers provided with co-axial openings in one element to another, these chambers being braced internally around these openings by rings concentric with the axes of the said openings.

The elements constituting the radiator may be threaded on tubes provided with openings providing a passage for the liquid, the openings in these tubes communicating with those of the interspacing rings of the chambers, the elements being tightened against one another by a pressure member, with the interposition of fluid-tight joints.

The pressure members pressing the elements against one another may be formed by a collar formed by one of the ends of the tube and by a tightening member screwed on to the other end of the said tube.

The assembly of elements may be surrounded by a cover plate and the faces of this cover plate, parallel to the central planes of the elements may be provided with undulations which are parallel to those of the elements and co-operate with these so as to form sinuous passages.

The outlet tube for cooled liquid may be connected to a circulating pump, of which the body is secured to the casing block of an internal combustion engine, by a shaped shell forming a section nozzle connected to the said tube by a flexible joint.

A supplementary tube, similar to the other tubes and combined in the same manner as those with the pile of elements, may be located at the lower part of the radiator and is provided with a drain cock.

The body of the circulating pump for liquid and each pipe, conducting the cooling liquid into the water chambers of the cylinders may be cast in the thickness of a plate which forms the front of the casing of the cylinder block.

One form of construction of the subject of the invention is shown by way of example in the accompanying drawings, wherein:

Fig. 3 is a vertical section on the line B—B' of Fig. 1.

Fig. 6 is a front view of the upper portion of the front face of an engine showing the volute and the water outlets of the water pump.

Fig. 7 is a section on the line C—C of Fig. 6.

The cooling device consists of an annular exchanger 1 and a turbine 2 located at the centre of the exchanger, the said turbine drawing in air through a central inlet 3 for causing it to flow radially through the exchanger.

Figure 1:
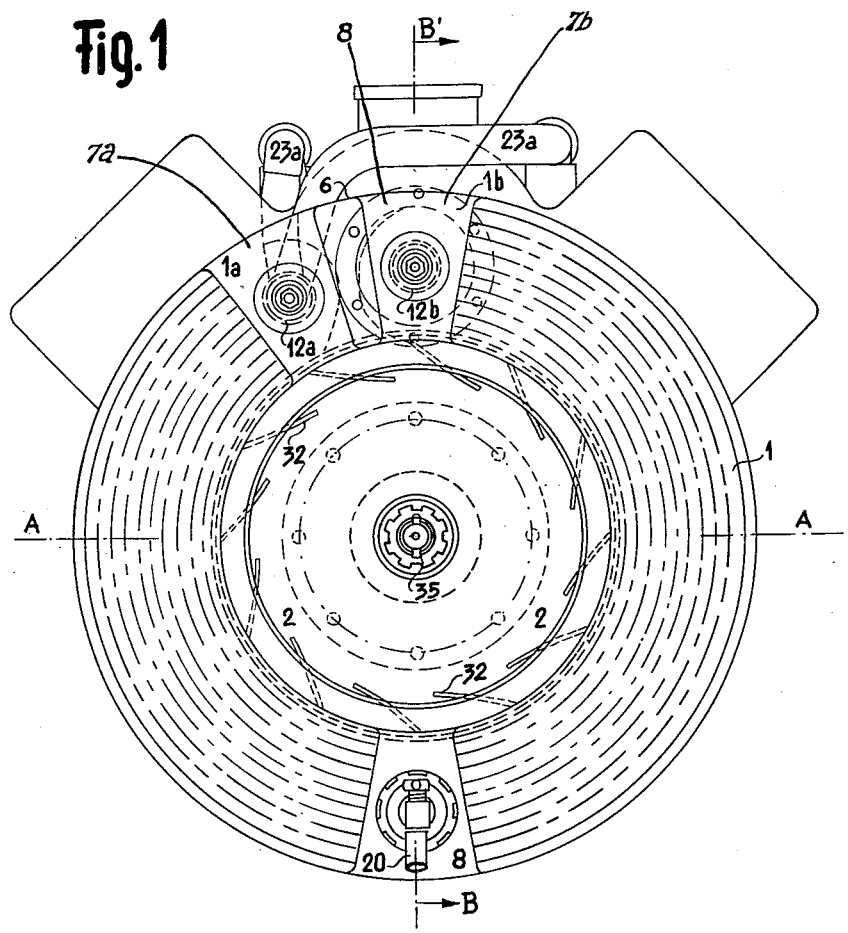
Fig. 1 is a front view of the cooling device.
Figure 2:
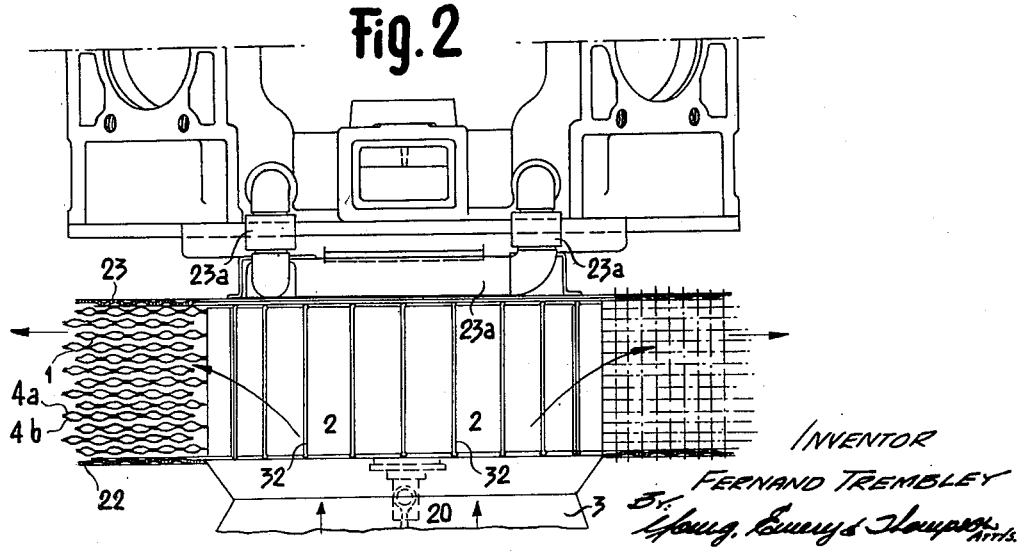
Fig. 2 is a plan view with a partial section on the line A—A of Fig. 1.
Figure 4:
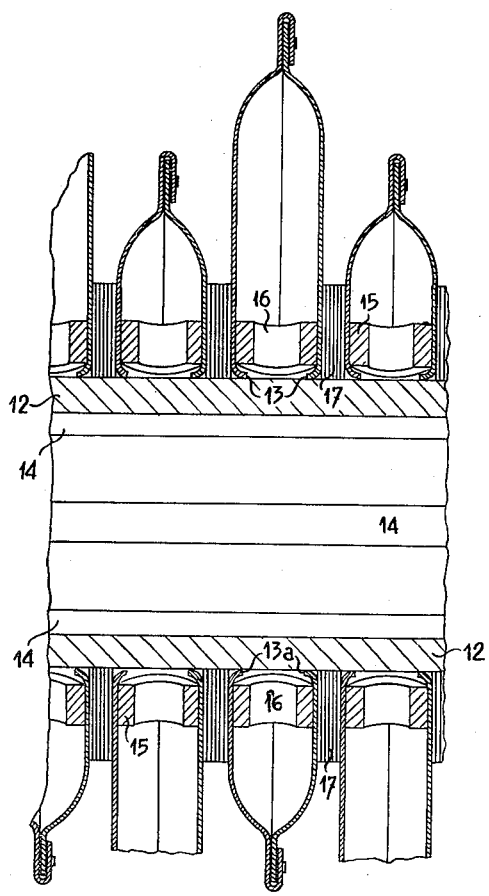
Fig. 4 is a section of a detail to a larger scale.
Figure 5:
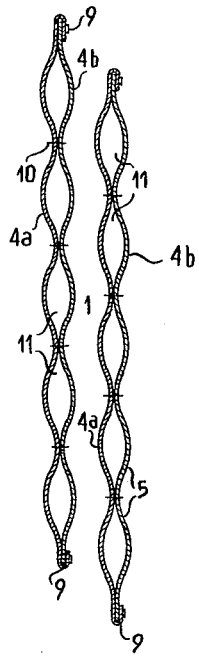
Fig. 5 shows, to a larger scale, a radial section, of current section, of a cooling element.

The exchanger is formed by a pile of cooling elements in the form of annular sectors, each element being formed by two parts or plates 4a and 4b; each part has, in usual section (Fig. 5), waves 5 of the same radius of curvature. The parts are interrupted at 6 and the portions adjacent this cut are plane as also the assembling portion on the discharge tube, which assembling is described hereinafter in greater detail. Two identical parts are arranged back to back and connected together by overlapping and electrically welding their edges 9 and spot welding at the troughs 10 of the adjacent waves. The cooling element thus formed has three parts forming a water chamber 7a, 7b and 8, connected together by passages 11.

The various elements entering into the constitution of the exchanger have internal and external radii varying from a half length wave when passing from an element of an even order to an element of an uneven order. The projecting waves of one element are thus opposite the hollow waves of the adjacent elements. All these elements are apertured concentrically on the same radius to the right of the parts 7a, 7b and 8, with a hole 13 of the diameter of the tubes 12a, 12b and 12c. The tubes 12a, 12b and 12c have longitudinal openings 14. The elements 4a, 4b, previously provided, during the course of their assembly, with spacing rings 15, with openings 16, and held in position by a slightly inturned edge 13a of the hole 13, are threaded on the tubes 12a, 12b and 12c with the interposition between them of spacing rings 17 forming a joint.

The pile of elements and joints bear against a collar 18 located at the rear part of the tubes 12a, 12b, 12c. On the other end of each tube is screwed a bolt 19, which, by means of a ring 20 and packing 21, compresses the pile of elements and packing. Between the packing 21 and the last packing of the pile is located a flange 22 having undulations parallel to those of the outer flange 4b of the last element of the pile and extending the front flange of the turbine. An identical flange 23, located at the rear portion of the pile, limits the exchanger towards the rear. The two flanges 22 and 23 form a callender surrounding the cooling elements. These flanges cannot be provided with undulations.

The exchanger thus formed has, in radial cross-section, an assembly of sinuous passages of constant width. The shape of these passages ensures a very satisfactory flow, without perturbation of the streams of air and an effective lapping of the outer surfaces of the circulating passages of the cooling liquid.

The tubes 12a, 12b and 12c communicate, through ports 14 and the holes 16 in the rings 15, with the interior of the parts 7a, 7b and 8 of the elements. The tube 12a is connected at its rear open part with return passages 23a for the return of the hot liquid of the engine. The device shown is conceived so as to be applied to a V-engine, which explains the double passages. The tube 12b is connected to the suction side of the water circulating pump 24. The pump, which is a centrifugal pump, is located between two half shells, one 25, at the front, which is removable, directly extends the tube 12b, the other 26, at the rear, being arranged in front plate 26a of the casing of the cylindrical block, around the driving shaft 27, of the pump and has two volutes 28a, 28b which directs the water discharged by the pump into the cold water feed pipes 29 of the engine. The shell 25 forms a suction nozzle and is connected to the outlet tube 12b for cooled liquid by a flexible joint. The tube 12c, located at the bottom portion of the exchanger, is closed at its two ends, the front wall being screwed for securing to a discharge cock 30. The turbine, provided with a flange 31 carrying the blades 32, is mounted on the nose 33 of the crankshaft 34. The transverse key 35 for starting the engine by a crank is easily accessible through the fan. The radiator assembly is mounted around the turbine by means of a cover plate 36; the cover plate is secured to the rear flange 23 of the radiator and is secured to a flange 37 which forms the front of the engine block. The radiator thus forms a complete block with the engine.

The cooling elements are preferably made of light alloys and are formed by two thin plates stamped to shape, corrugated and assembled by continuous electric welding at their periphery and by spot welding at the troughs of the waves. A grouping of minimum overall size is obtained by securing the cooling device against the ends of the engine opposite the outlet of the engine shaft from the engine, by mounting the turbine directly on the free end of the engine shaft and incorporating, if necessary, the circulating pump for the cooling liquid in the casing itself of the engine block. Such an arrangement makes it possible to reduce considerably the length and the number of passages and connections, whilst allowing of easy removal of the radiator and, if necessary, of the circulating pump. This device also permits, if necessary of constructing the assembly as a single engine-radiator block.

The cooling device thus constituted has various technical advantages and in particular:

1. of being capable of being constructed of light alloys, and of requiring neither tubes, blades, soldering with metal on the market.

2. of being light in weight and of enabling, relatively to usual devices, a considerable reduction in total weight being obtained.

3. of providing considerable facilities in assembling and disassembling.

4. of having a refrigerating capacity easily adjustable by the addition or removal of elements.

5. of having great robustness by reason of the absence of tin solders.

6. and particularly in reducing to a minimum the power absorbed by the radiator, this not opposing any frontal resistance to the forward movement of the vehicle and the turbine absorbing a power which decreases in proportion to the increase in speed of the vehicle.

I claim:

1. A cooling device for an internal combustion engine having a water cooling system, said device comprising an exchanger located between the liquid of the said water cooling system and cooling air, said exchanger including a pile of hollow cooling elements, said cooling elements being in the form of annular sectors having undulated surfaces, the concentric waves of two adjacent elements being relatively displaced and interengaging one another in such a manner as to form sinuous radial passages between adjacent pairs of elements, at least one inlet tube for said cooling liquid, at least one outlet tube for said cooling liquid, said elements being mounted on said tubes, jointing elements between said elements and said tubes, and a turbine, means of communication between the interior of said tubes, the spaces between said cooling elements and said turbine, said turbine being driven by said engine and propelling air through said radial passages, a circulating pump to which said outlet tube is connected, a casing block for said internal combustion engine, a shaped shell connecting said pump to said casing block, said shell forming a suction nozzle, and a flexible joint connecting said nozzle to said tube.

2. A cooling device for an internal combustion engine having a water cooling system, said device comprising an exchanger located between the liquid of the said water cooling system and cooling air, said exchanger including a pile of hollow cooling elements, said cooling elements being in the form of annular sectors having undulated surfaces, the concentric waves of two adjacent elements being relatively displaced and interengaging one another in such a manner as to form sinuous radial passages between adjacent pairs of elements, at least one inlet tube for said cooling liquid, at least one outlet tube for said cooling liquid, said elements being mounted on said tubes, jointing elements between said elements and said tubes, and a turbine, means of communication between the interior of said tubes, the spaces between said cooling elements and said turbine, said turbine being driven by said engine and propelling air through said radial passages, a circulating pump to which said outlet tube is connected, a casing block for said internal combustion engine, a shaped shell connecting said pump to said casing block, said shell forming a suction nozzle, and a flexible joint connecting said nozzle to said tube, said pump and each pipe for supplying cooling water to water jackets of cylinders of said internal combustion engine being cast in the thickness of a plate which forms the front of the casing of a cylinder block.

3. A cooling device for an internal combustion engine having a liquid cooling system, said cooling device comprising a heat exchanger for transferring heat from the liquid of the cooling system to air, said heat exchanger being formed of a pile of hollow cooling elements of annular form, each cooling element being formed of a pair of symmetrical plates each provided with concentric circular corrugations with the corrugations of one plate of each pair being symmetrical with the corrugations of the other plate of the pair, and the plates of each pair being joined at their edges with the symmetrical corrugations cooperating to form a plurality of concentric circular liquid passages between the plates of each element, the corrugations of the plates of adjacent cooling elements having the circular corrugations therein staggered with the crests of the corrugations of the plates of one cooling element lying opposite the valleys of the corrugations of the plates of adjacent cooling elements in nesting relation, said annular cooling elements having liquid inlet and liquid outlet openings, a liquid inlet tube extending through the inlet openings of the pile of elements, a liquid outlet tube extending through the outlet openings of the pile of elements, separating elements surrounding the tubes and positioned between adjacent elements to maintain them in spaced nested relation to provide sinuous radial passages between the elements, and a turbine disposed at the center of the heat exchanger and driven by the engine for forcing air radially outwardly through the sinuous radial passages between the spaced cooling elements.

4. A cooling device according to claim 3 further comprising plates at the front and rear portions of the pile of cooling elements for supporting said elements.

5. A cooling device according to claim 3 further comprising plates at the front and rear portions of the pile of cooling elements for supporting said elements, said front and rear plates having circular concentric corrugations nested in spaced relations with the adjacent plates of the cooling elements to provide further sinuous passages for the outward radial flow of air from the turbine.

6. A cooling device according to claim 3 in which the annular cooling elements are disposed with their axes generally horizontal and the liquid inlet and outlet openings are at the upper portion of the pile of cooling elements and in which drain openings are provided at the lower portion of the cooling elements and further comprising a drain tube extending through said lower openings and communicating with the liquid passages in said cooling elements, and a drain valve in the end of said drain tube.

7. A cooling device according to claim 3 further comprising a liquid circulating pump having a housing in the form of a shaped shell connected to the block of the engine, said shell forming a suction nozzle and a flexible joint connecting said nozzle to said liquid outlet tube.

8. A cooling device according to claim 3 further comprising a circulating pump to which said outlet tube is connected, a casing block for said internal combustion engine, a shaped shell connecting said pump to said casing block, said shell forming a suction nozzle, and a flexible joint connecting said nozzle to said tube, said pump and each pipe for supplying cooling water to water jackets of cylinders of said internal combustion engine being cast in the thickness of a plate which forms the front of the casing of a cylinder block.

FERNAND TREMBLEY.

REFERENCES CITED

The following references are of record in the file of this patent:

UNITED STATES PATENTS

| Number | Name | Date |
| --- | --- | --- |
| 1,754,689 | MacPherson | Apr. 15, 1930 |
| 1,766,858 | Vincent | June 24, 1930 |

FOREIGN PATENTS

| Number | Country | Date |
| --- | --- | --- |
| 218,017 | Germany | 1910 |
| 827,989 | France | 1938 |
| 546,172 | Great Britain | 1942 |